United States Patent
Smirnov et al.

(10) Patent No.: US 8,438,587 B2
(45) Date of Patent: May 7, 2013

(54) MOTOR HAVING IMPROVED SLEEVE HOLDER AND BASE PLATE COMBINING STRUCTURE AND OPTICAL DISC DRIVE USING THE SAME

(75) Inventors: Viatcheslav Smirnov, Gyunggi-do (KR); Dong Yeon Shin, Gyunggi-do (KR); Pyo Kim, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 12 days.

(21) Appl. No.: 12/929,372

(22) Filed: Jan. 19, 2011

(65) Prior Publication Data

US 2012/0017226 A1    Jan. 19, 2012

(30) Foreign Application Priority Data

Jul. 16, 2010    (KR) .................. 10-2010-0069189

(51) Int. Cl.
G11B 19/20    (2006.01)
H02K 5/167    (2006.01)

(52) U.S. Cl.
USPC .................................... 720/697; 310/425

(58) Field of Classification Search ............... 360/265.6, 360/99.08, 99.16; 720/696, 697; 310/425
See application file for complete search history.

(56) References Cited

U.S. PATENT DOCUMENTS

| | | | |
|---|---|---|---|
| 5,237,472 A * | 8/1993 | Morehouse et al. | 360/254.8 |
| 5,249,092 A * | 9/1993 | Russell-Smith et al. | 360/264.2 |
| 5,299,081 A * | 3/1994 | Hatch et al. | 360/244.2 |
| 5,333,080 A * | 7/1994 | Ridinger et al. | 360/99.12 |
| 5,552,650 A * | 9/1996 | Cap et al. | 310/67 R |
| 5,600,514 A * | 2/1997 | Fukuzawa | 360/99.08 |
| 5,672,927 A * | 9/1997 | Viskochil | 310/194 |
| 5,796,707 A * | 8/1998 | Kim | 720/697 |
| 5,883,751 A * | 3/1999 | Choy | 360/84 |
| 5,978,175 A * | 11/1999 | Wuester et al. | 360/99.08 |
| 6,181,669 B1 * | 1/2001 | Park | 720/697 |
| 6,661,131 B2 | 12/2003 | Fukutani | |
| 6,772,428 B2 * | 8/2004 | Kim et al. | 720/697 |
| 6,956,713 B2 * | 10/2005 | Shinmi et al. | 318/400.41 |
| 6,965,492 B2 * | 11/2005 | Obata et al. | 360/99.08 |
| 7,023,116 B2 * | 4/2006 | Kuribara | 310/90 |
| 7,249,363 B2 * | 7/2007 | Noda et al. | 720/721 |
| 7,489,056 B2 * | 2/2009 | Harada | 310/40 R |

(Continued)

FOREIGN PATENT DOCUMENTS

| | | |
|---|---|---|
| JP | 10-234154 | 9/1998 |
| JP | 2003-52143 | 2/2003 |

(Continued)

OTHER PUBLICATIONS

Partial Machine translation of JP2006-67652; Yoshida, 9 pages, Mar. 9, 2006.*

(Continued)

Primary Examiner — Brian Miller

(57) ABSTRACT

There is provided a motor with an improved sleeve holder and base plate combining structure and an optical disc drive using the same. The motor according to the present invention includes a base plate having a plate shape; a sleeve holder including a cylindrical body part having a sleeve fastened thereinto and a flange part formed to be horizontally protruded in an outer-diameter direction from the lower end portion of the body part to surface-contact the upper surface of the base plate.

6 Claims, 5 Drawing Sheets

U.S. PATENT DOCUMENTS

| | | | |
|---|---|---|---|
| 7,496,940 B2 * | 2/2009 | Wang | 720/697 |
| 7,508,102 B2 * | 3/2009 | Sugiyama et al. | 310/67 R |
| 7,593,182 B2 * | 9/2009 | Tamaoka et al. | 360/99.08 |
| 7,652,851 B2 * | 1/2010 | Hashi et al. | 360/265.6 |
| 7,760,464 B2 * | 7/2010 | Xu et al. | 360/99.16 |
| 8,099,743 B2 * | 1/2012 | Wada | 720/691 |
| 8,148,882 B2 * | 4/2012 | Yoon | 310/425 |
| 2003/0112734 A1 * | 6/2003 | Shishido et al. | 369/263 |
| 2006/0006746 A1 | 1/2006 | Nishikata et al. | |
| 2007/0007836 A1 | 1/2007 | Hyun | |
| 2008/0278027 A1 | 11/2008 | Ikemoto et al. | |
| 2010/0314958 A1 | 12/2010 | Hidaka et al. | |
| 2011/0219392 A1 * | 9/2011 | Yoon et al. | 720/663 |
| 2012/0017225 A1 * | 1/2012 | Smirnov et al. | 720/695 |
| 2012/0017226 A1 * | 1/2012 | Smirnov et al. | 720/695 |

FOREIGN PATENT DOCUMENTS

| | | |
|---|---|---|
| JP | 2003-333792 | 11/2003 |
| JP | 2006-67652 | 3/2006 |
| JP | 2008-113475 | 5/2008 |
| JP | 2009-171725 | 7/2009 |
| KR | 10-2005-0035731 | 4/2005 |
| KR | 10-2006-0030705 | 4/2006 |
| KR | 10-2008-0097293 | 11/2008 |
| KR | 10-2008-0099793 | 11/2008 |

OTHER PUBLICATIONS

Korean Office Action issued Aug. 16, 2011 in corresponding Korean Patent Application 10-2010-0069189.

Japanese Office Action issued Jan. 8, 2013 for corresponding Japanese Application No. 2011-013197.

* cited by examiner

MOTOR HAVING IMPROVED SLEEVE HOLDER AND BASE PLATE COMBINING STRUCTURE AND OPTICAL DISC DRIVE USING THE SAME

CROSS-REFERENCE TO RELATED APPLICATIONS

This application claims the priority of Korean Patent Application No. 10-2010-0069189 filed on Jul. 16, 2010, in the Korean Intellectual Property Office, the disclosure of which is incorporated herein by reference.

BACKGROUND OF THE INVENTION

1. Field of the Invention

The present invention relates to a motor and an optical disc drive using the same, and more particularly, to a motor with an improved sleeve holder and base plate combining structure and an optical disc drive using the same.

2. Description of the Related Art

Generally, a spindle motor equipped in an optical disc drive serves to rotate a disc so that an optical pickup mechanism can read data recorded on the disc.

The existing spindle motor is fixed to a base plate by mounting a circuit substrate on the base plate and inserting a sleeve holder into a hole formed at the central portion of the base plate, or the like. The lower surface of the sleeve holder is fastened with a separate supporting plate.

The existing sleeve holder is formed by cutting machining and relatively expensive brass has mainly been used as a material therefore. As such, as the sleeve holder uses the relatively expensive brass, there is a problem in that the manufacturing cost of the existing motor is increased.

SUMMARY OF THE INVENTION

According to an aspect of the present invention, there is provided a motor, including: a base plate having a plate shape; and a sleeve holder including a cylindrical body part having a sleeve fastened thereinto and a flange part formed to be horizontally protruded in an outer-diameter direction from the lower end portion of the body part to surface-contact the upper surface of the base plate.

The sleeve holder may include an extending part protruded at the position adjacent to the flange part to extend an outer diameter thereof along the outer peripheral surface of the body part.

The sleeve holder may include a stator seating part horizontally extended in an outer-diameter direction from the outer peripheral surface of the body part by the extending part.

The extending part may be protruded to be extended to the flange part.

The flange part may be provided with at least one alignment hole to easily align the sleeve holder when the sleeve holder is combined with the base plate.

The alignment hole may be formed in two as different shapes and is each disposed on a straight line passing through the central axis of the sleeve holder.

The base plate may have a receiving part in a groove shape formed at a position corresponding to the extending part of the sleeve holder.

The motor may further include: a cylindrical sleeve fastened in the sleeve holder; a shaft rotatably inserted in the sleeve; and a thrust plate supporting the lower end portion of the shaft.

The thrust plate may be received in the extending part.

The motor may further include a stopper ring formed in a ring shape and inserted between the upper surface of the thrust plate and the lower surface of the sleeve to suppress floating of the shaft.

The flange part may be protruded while forming a step upward in a shaft direction from the lower end surface of the extending part.

The base plate may have a receiving part in a groove shape formed at a position corresponding to the extending part of the sleeve holder and the lower end surface of the extending part is inserted into the receiving part.

The flange part may include at least one protruding part protruded downward from the lower surface opposite to the base plate, the base plate includes at least one insertion hole formed at a position corresponding to the protruding part, and the sleeve holder and the base plate are fixedly fastened to each other by inserting the protruding part into the insertion hole.

The protruding part may be formed by burring machining or press machining.

The end of the protruding part may be bent in an outer-diameter direction to support the lower surface of the base plate.

The sleeve holder and the base plate may be fastened to each other by at least one fastening method of press-fitting, bonding, and welding.

The sleeve holder and the base plate may be manufactured by press machining or injection molding.

According to another aspect of the present invention, there is provided an optical disc drive including: any one motor described above and an optical pickup mechanism movably mounted in the lower space of a disc equipped on the motor and receiving data from the disc.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
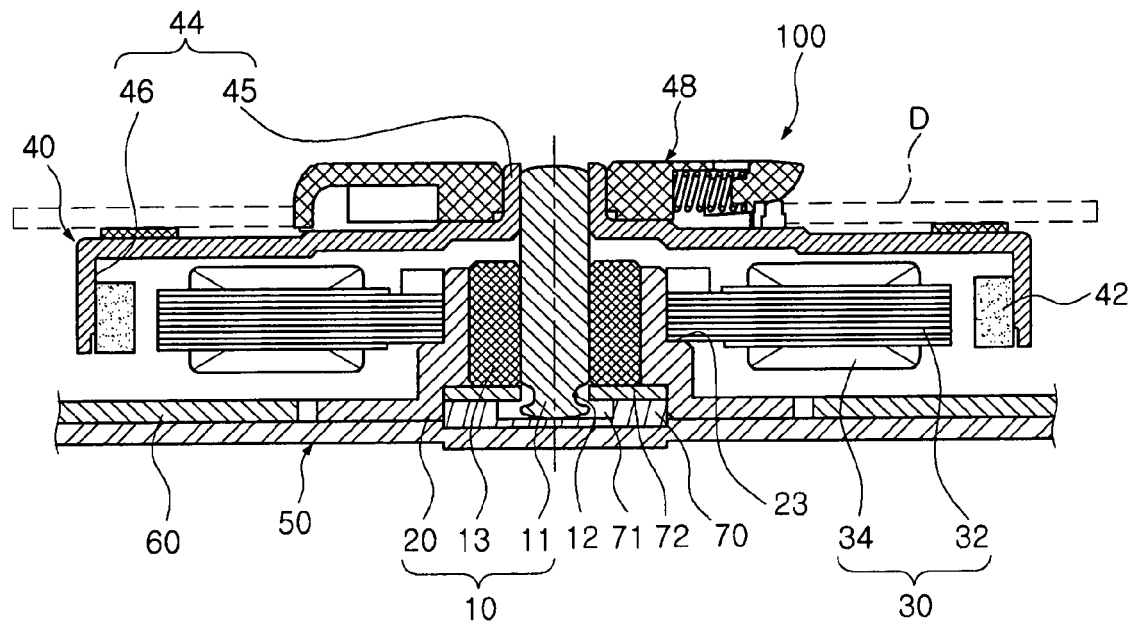
FIG. 1 is a cross-sectional view schematically showing a motor according to an exemplary embodiment of the present invention.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention. Therefore, the configurations described in the embodiments and drawings of the present invention are merely most preferable embodiments but do not represent all of the technical spirit of the present invention. Thus, the present invention should be construed as including all the changes, equivalents, and substitutions included in the spirit and scope of the present invention at the time of filing this application.

Hereinafter, embodiments of the present invention will be described with reference to the accompanying drawings. However, the present invention is not limited to the embodiments disclosed herein. In this case, it is noted that like reference numerals denote like elements in appreciating the drawings. Moreover, detailed descriptions related to well-known functions or configurations will be ruled out in order not to unnecessarily obscure the subject matter of the present invention. Based on the same reason, it is to be noted that some components shown in the drawings are exaggerated, omitted or schematically illustrated, and the size of each component does not exactly reflect its real size.

Meanwhile, terms for directions are defined. An axial direction means a vertical direction based on a shaft 11 when being viewed in FIG. 1, while an outer-diameter direction means an outer end direction of a rotor 40 based on the shaft 11 and an inner-diameter direction means a central direction of the shaft 11, based on the outer end of the rotor 40.

Hereinafter, exemplary embodiments of the present invention will be described in detail with reference to the accompanying drawings.

Figure 2:
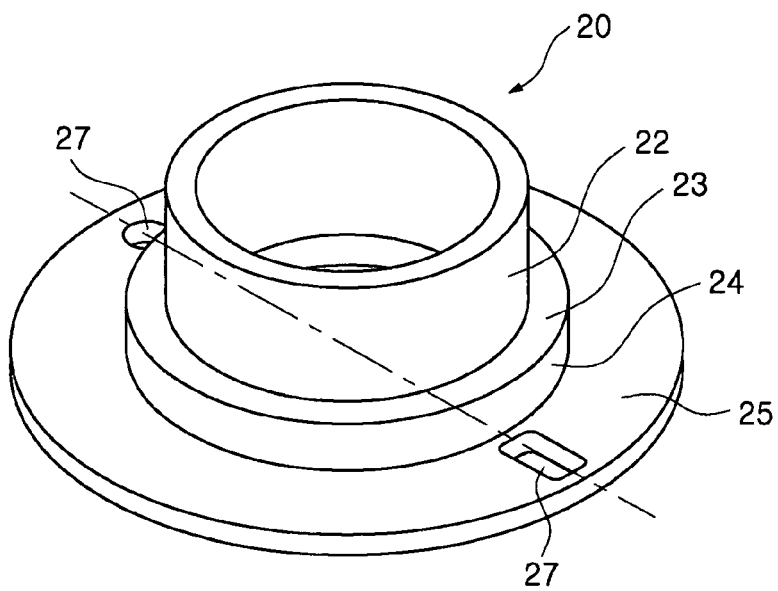
FIG. 2 is a perspective view showing a sleeve holder of FIG. 1.
Figure 3:
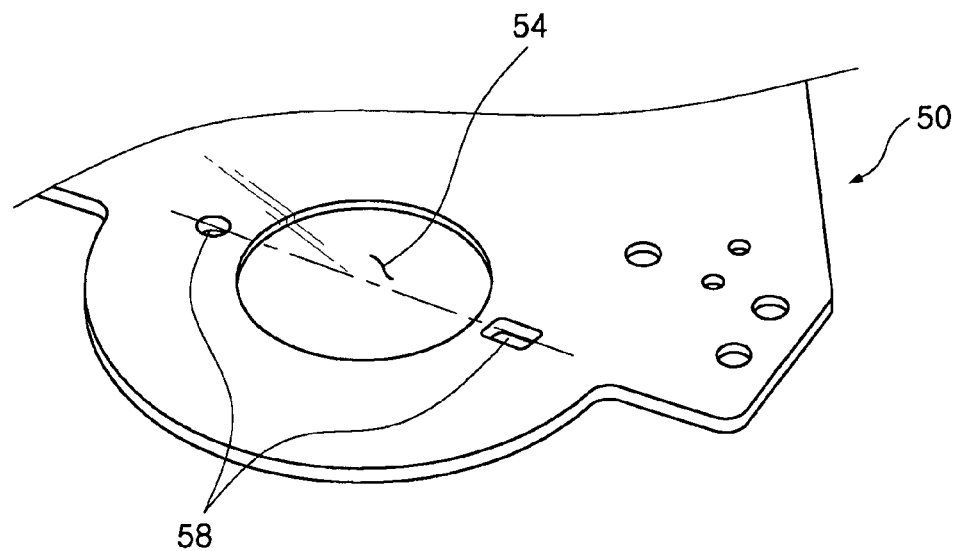
FIG. 3 is a perspective view showing the base plate of FIG. 1.

FIG. 1 is a cross-sectional view schematically showing a motor according to an exemplary embodiment of the present invention, FIG. 2 is a perspective view showing a sleeve holder of FIG. 1, and FIG. 3 is a perspective view showing the base plate of FIG. 1.

Referring to FIGS. 1 to 3, the motor 100 according to the present exemplary embodiment is a spindle motor 100 provided in the optical disc driver rotating a disc D. The motor 100 is configured to include a stator 30, a rotor 40, a bearing assembly 10, a base plate 50, and a circuit substrate 60.

The stator 30 is a fixing structure configured to include a core 32 and a winding coil 34 wound on the core 32.

The core 32 according to the present exemplary embodiment is configured by stacking a plurality of steel plates and is formed to be radially extended in the outer-diameter direction of the shaft 11 using the shaft 11 as a central axis. The core 32 is seated on a stator seating part 23 of the sleeve holder 20 to be described below and is fixedly fastened to the sleeve holder 20.

The winding coil 34 is a coil wound on the core 32, which generates electromagnetic force when power is applied thereto. The winding coil 34 according to the present exemplary embodiment is electrically connected to the circuit substrate 60, such that it is supplied with power from the circuit substrate 60.

The rotor 40 is configured to include a magnet 42 and a rotor case 44.

The magnet 42 is an annular ring permanent magnet generating a magnetic force of a predetermined strength by alternately magnetizing an N pole and an S pole thereof.

The rotor case 44 is formed in a cup shape to receive a stator 30 therein and is configured to include a rotor hub 45 and a magnet coupling part 46.

The rotor hub 45 is press-fitted in the upper end portion of the shaft 11 to be fixedly fastened thereto and is formed to be bent upward in a shaft direction in order to maintain an unmating force with the shaft 11. In addition, the outer peripheral surface of the rotor hub 45 is combined with a chucking mechanism 48 that can mount the disc D.

The magnet coupling part 46 is fastened with the magnet 42 and is formed along the inner peripheral surface of the rotor case 44. In this configuration, the magnet 42 is disposed to be opposite the core 32 on which the winding coil 34 is wound. Therefore, when power is applied to the winding coil 34, the rotor 40 is rotated by the electromagnetic interaction between the magnet 42 and the winding coil 34. The shaft 11 and the chucking mechanism 48 fastened to the rotor case 44 are rotated together due to the rotation of the rotor 40.

The bearing assembly 10 rotatably supports the shaft 11 and is configured to include the sleeve 13 and the sleeve holder 20.

The shaft 11 according to the present exemplary embodiment may be provided with a stopper ring fastening groove 12 having a stopper ring 72 inserted at the lower end thereof in order to prevent the shaft 11 from being separated from the sleeve 13 according to the high-speed rotation of the rotor case 44.

The sleeve 13 has the shaft 11 inserted into a hole formed therein and forms an oil film between the sleeve 13 and the shaft 11 in order to easily rotate the shaft 11. The sleeve 13 is a rotation supporting member supporting the shaft 11 and serves as a bearing. The outer peripheral surface of the sleeve 13 is press-fitted in the sleeve holder 20 to be described below to be fixed thereto.

The sleeve holder 20 is a fixing structure rotatably supporting the shaft 11 therein and rotatably supporting the shaft 11 through the sleeve 13.

The sleeve holder 20, according to the exemplary embodiment, is formed to have a cylindrical shape and is configured to include a body part 22, an extending part 24 formed to be extended from the body part 22, and a flange part 25 formed to be protruded from the lower end of the extending part 24 in order to surface-contact the upper surface of the base plate 50.

The body part 22 is fastened to the sleeve 13 which is inserted therein.

The extending part 24 is formed to be protruded in the outer-diameter direction so that the outer diameter thereof is extended along the outer peripheral surface of the body part 22. In addition, a horizontal surface horizontally extending in an outer-diameter direction from the outer peripheral surface of the body part 22 by the extending part 24 is formed as a stator seating part 23.

The outer diameter of the extending part 24 according to the present exemplary embodiment extends to the flange part 25. Therefore, the inner space from the extending part 24 to the flange part 25 is formed to have a cylindrical space to be expanded wider than the body part 22.

As such, the stator seating part 23 formed by the extending part 24 is seated with the stator 30 to be described below to be fixedly fastened thereto. The inner space expanded by the extending part 24 is used as a space in which a thrust plate 70 and a stopper ring 72 to be described below are received.

The flange part 25 is formed to be protruded by a predetermined distance in an outer-diameter direction from the lower end portion of the extending part 24 and is fastened with the base plate 50 to surface-contact the upper surface of the base plate 50.

In addition, the flange part 25 according to the present invention has at least one alignment hole 27 provided therein. The alignment hole 27 is to more precisely align and combine the sleeve holder 20 and the base plate 50 when the sleeve holder 20 is combined with the base plate 50.

The alignment hole 27 according to the present exemplary embodiment may be formed in plural. At least one of the alignment holes may be formed in a shape differentiated from the remaining alignment holes. Referring to FIG. 2, two alignment holes 27 are formed on a straight line passing through the central shaft of the sleeve holder 20 so as to be symmetrical with each other. A case in which one of the two alignment holes 27 is formed in a quadrangular hole will be described by way of example. When the shape of at least one alignment hole 27 is formed to be differentiated from the shape of the other alignment holes 27, it is possible to more easily align the sleeve holder 20.

The sleeve holder 20 according to the present exemplary embodiment is formed by pressing a steel plate, or the like, not brass or the injection molding thereon, as in the related art. Therefore, the sleeve can be more easily manufactured at low cost.

The base plate 50 is a support entirely supporting other components of the motor 100 and one surface thereof, that is, the upper surface thereof is fixedly fastened to the above-mentioned sleeve holder 20 and the circuit substrate 60 to be described below.

The present invention is characterized in that the base plate 50 is integrally configured with the supporting plate according to the related art and the upper surface thereof is fastened to the sleeve holder 20.

To this end, the base plate 50 according to the exemplary embodiment of the present invention has a receiving part 54 formed therein.

Meanwhile, the base plate 50 according to the exemplary embodiment of the present invention is formed in one consecutive plate. That is, the base plate 50 according to the exemplary embodiment of the present invention forms the receiving part 54 by cutting (or pressing) one plate.

The receiving part 54 is formed in a groove shape and is formed to have a size corresponding to the shape of the expanding part of the sleeve holder. Therefore, the base plate 50 according to the present invention is formed in a shape including the supporting plate and therefore, does not require the separate supporting plate supporting the lower end of the shaft, as in the related art.

The receiving part 54 is used as a space in which the thrust plate 70, to be described below, is seated. Therefore, the receiving part 54 is formed to have a size similar to the outer diameter of the thrust plate 70.

In addition, the base plate 50 according to the present exemplary embodiment has at least one alignment hole 58 provided therein. The alignment hole 58 is formed at a position (that is, a symmetrical position on a straight line passing through the central axis of the receiving part 54) corresponding to the alignment hole 27 formed on the flange part 25 of the sleeve holder 20 having shapes corresponding to each other. Therefore, when the sleeve holder 20 is combined with the base plate 50, they may be easily aligned and combined through the alignment holes 27 and 58 formed in the sleeve holder 20 and the base plate 50.

The alignment grooves 27 and 58 may be used when the motor 100 is assembled, but may be omitted when the assembling jig (not shown) does not require the alignment grooves 27 and 58.

As described above, the base plate 50 according to the present exemplary embodiment is made of a metal material. In particular, the base plate 50 is preferably made of a steel material and may be formed by bending or pressing a sheet of metal plate. However, the manufacturing of the base plate 50 is not limited thereto and may be manufactured by various methods, such as the injection molding, or the like.

The thrust plate 70 is seated in the receiving part 54 formed on the base plate 50 and the outer peripheral edge thereof is received in the expanding part 24 of the sleeve holder 20. In addition, the center of the upper surface of the thrust plate 70 is formed with the shaft supporting part 71 in a groove shape. The shaft supporting part 71 is inserted with the shaft 11 and the bottom surface of the shaft supporting part 71 contacts the lower end of the shaft 11 to support the shaft 11.

The stopper ring 72 is inserted between the lower surface of the sleeve 13 and the upper surface of the thrust plate 70 and is partially protruded into the stopper ring fastening groove 12 of the shaft 11 to suppress floating of the shaft 11 when the rotor 40 is rotated.

The circuit substrate 60 may be fastened to the base plate 50 over the upper surface of the base plate 50. The inside of the circuit substrate 60 is provided with circuit patterns (not shown) applying power to the motor 100 and is electrically connected to the winding coil 34 of the rotor 40 to apply power to the winding coil 34. In addition, a ground pattern among the circuit patterns of the circuit substrate 60 may be formed to be conducted to the base plate 50. As the circuit substrate 60, various substrates such as a general printed circuit board (PCB), a flexible circuit board (FPCB), or the like, may be selectively used, if necessary.

In the motor 100 according to the present invention, the sleeve holder 20 is fastened to the base plate 50 such that the flange part 25, formed on the lower surface of the sleeve holder 20, surface-contacts the upper surface of the base plate 50. Therefore, the motor 100 according to the present invention widely contacts the base plate 50 and is bonded thereto by using the entire lower surface of the flange part 25, such that it may be more firmly fastened to the base plate 50.

The sleeve holder 20 according to the present invention may be bonded to the base plate 50 by an adhesive and a laser welding. The fixing fastening method will be described in more detail through the exemplary embodiments to be described below.

The motor according to the following exemplary embodiments is configured to have a similar structure to the motor (100 of FIG. 1) according to the foregoing exemplary embodiment and has a difference in only the structure and combining shape of the base plate and the sleeve holder. Therefore, the same components are denoted by the same reference numerals and the detailed description thereof will be omitted. As a result, the structure and combining shape of the base plate and the sleeve holder will mainly be described in more detail below.

Figure 4:
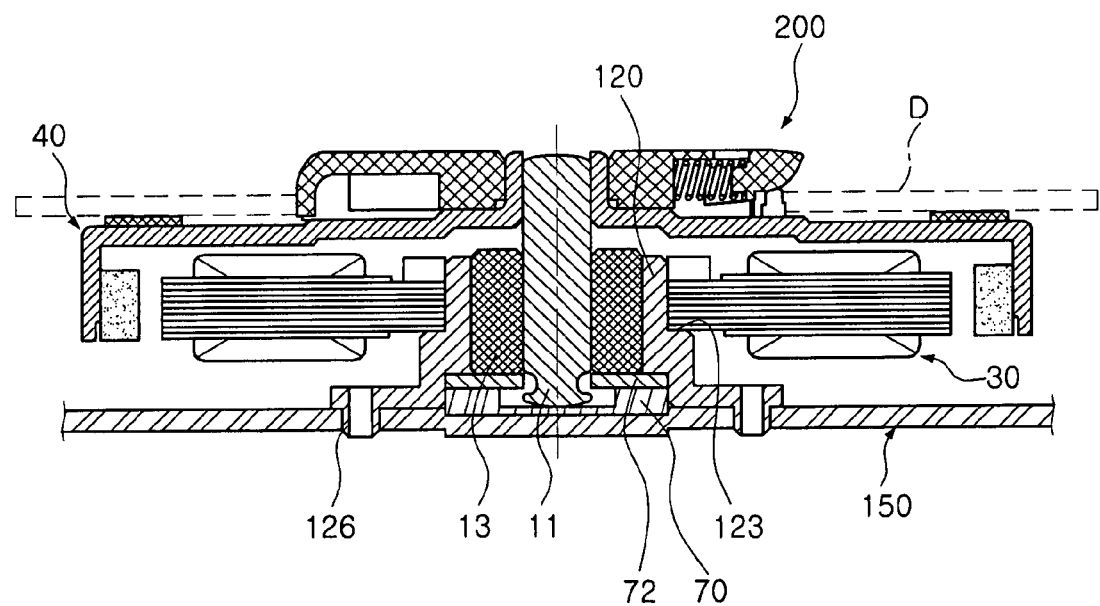
FIG. 4 is a cross-sectional view schematically showing a motor according to another exemplary embodiment of the present invention.

FIG. 4 is a cross-sectional view schematically showing a motor according to another exemplary embodiment of the present invention. Further, FIG. 5 is a perspective showing a sleeve holder of FIG. 4 and FIG. 6 is a perspective view showing a base plate of FIG. 4.

Figure 5:
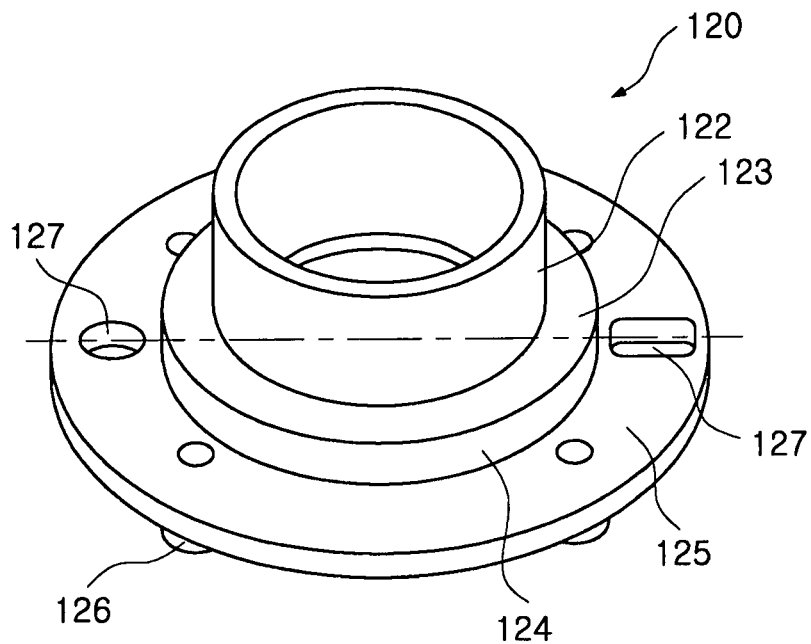
FIG. 5 is a perspective view showing a sleeve holder of FIG. 4.
Figure 6:
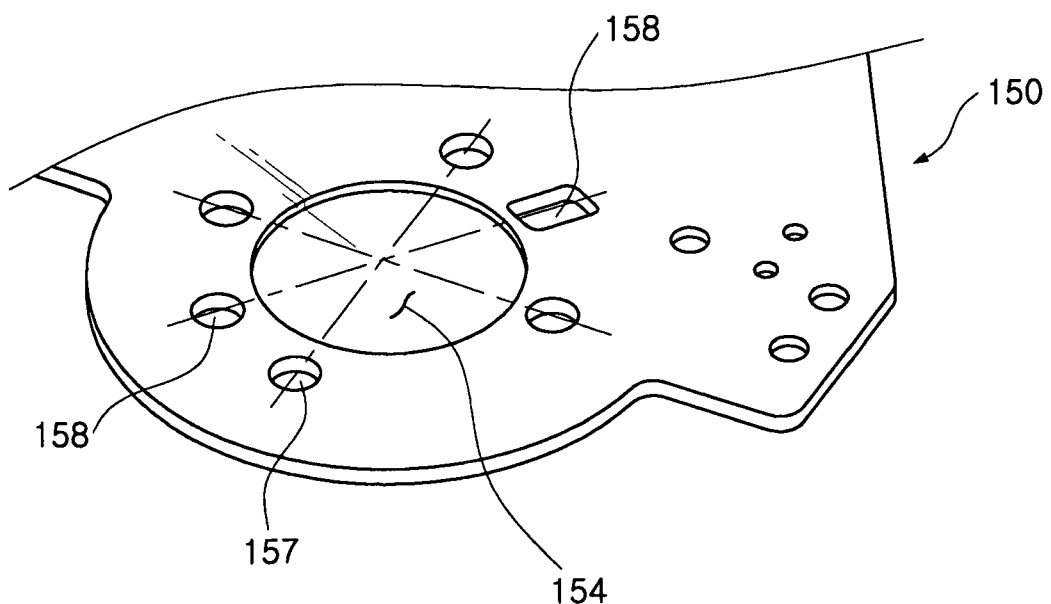
FIG. 6 is a perspective view showing the base plate of FIG. 4.

Referring to FIGS. 4 to 6, a base plate 150 of a motor 200 according to the present exemplary embodiment is configured similar to the base plate 50 of FIG. 1, but has a difference in that an insertion hole 157 is formed on the base plate 150.

Described in more detail, the base plate 150 according to the present invention has a receiving part 154, an insertion hole 157, and an alignment hole 158 provided therein.

The receiving part 154 and the alignment hole 158 are formed in a similar manner to that of the foregoing exemplary embodiment and therefore, the detailed description thereof will be omitted.

When the base plate 150 according to the present exemplary embodiment is fastened to the sleeve holder 120, at least one insertion hole 157 is formed at a position contacting the flange part 125. The insertion hole 157 is used as a portion into which the protruding part 126 of the sleeve holder 120 to be described below is inserted. Therefore, the insertion hole 157 according to the present exemplary embodiment is formed corresponding the positions and number of protruding portions 126 formed on the flange part 125 of the sleeve holder 120.

The sleeve holder 120 according to the present exemplary embodiment is configured to include a body part 122, an expanding part 124, and a flange part 125, similar to the foregoing exemplary embodiment.

In addition, the flange part 125 according to the present exemplary embodiment has at least one alignment hole 127 and at least one protruding part 126 provided therein. The alignment hole 127 is formed similar to the foregoing exemplary embodiment and therefore, the detailed description thereof will be omitted.

The protruding part 126 is formed to be protruded by a predetermined distance from one surface of the flange part 125, that is, the lower surface opposite to the base plate 150. Therefore, the protruding part 126 is protruded from the positions corresponding to the positions of the insertion hole 157 and is formed to have a size corresponding to the insertion hole 157. In addition, the protruding part 126 is protruded by a length similar to the thickness of the base plate 150.

In the above-mentioned motor 200 according to the present exemplary embodiment, the protruding part 126 is inserted into the insertion hole 157 formed on the base plate 150 and the sleeve holder 120 is fixedly fastened to the base plate 150. In this configuration, in order to increase the adhesion, the protruding part 126 may be configured to be press-fitted in the insertion hole 157 and inserted thereinto.

The protruding part 126 according to the present exemplary embodiment may be formed by the burring or press machining. Therefore, the protruding part 126 may be formed to have a hollow cylindrical shape.

As described above, in the motor 200 according to the present exemplary embodiment in which the sleeve holder 120 includes the protruding part 126, the protruding part 126 formed in the sleeve holder 120 is inserted into the insertion hole 157 formed on the base plate 150 and the sleeve holder 120 is fastened to the base plate 50. In particular, when the protruding part 126 may be fastened to the insertion hole 157 to be press-fitted thereto, so that the sleeve holder 120 may be more easily fastened to the base plate 150.

Meanwhile, the motor 200 according to the present exemplary embodiment is not limited to the fastening method of press-fitting the protruding part 126 of the sleeve holder 120 in the insertion hole of the base plate 150. In other words, the protruding part 126 may be fastened to the sleeve holder 120 by the fixing fastening method such as bonding, welding, or the like. Further, the adhesion between the sleeve holder 120 and the base plate 150 may be strengthened by using the plurality of fastening methods in combination, not one fastening method.

In this case, when the fixing fastening method such as bonding, welding, or the like, is used, the lower surface of the flange part 125 on which the sleeve holder 120 surface-contacts the base plate 150 and a portion on which the protruding part 126 contacts the insertion hole 157 may be used a bonding surface, in the motor 200 according to the present exemplary embodiment.

In addition, in the motor 200 according to the present exemplary embodiment, the end of the protruding portion 126 inserted into the insertion hole 157 may be formed to be bent in the outer-diameter direction, in order to fasten the base plate 150 to the sleeve holder 120. This may be formed by inserting the cylindrical protruding part 126 into the insertion hole 157 of the base plate 150 and then machining and bending the end of the protruding part 126 by a spinning method, a caulking method, or the like.

In this case, in the insertion hole 157 formed on the base plate 150, the inner peripheral edge of a portion contacting the lower surface of the base plate 150 may be formed as a tapered slope surface. This is to easily bend the end of the protruding part 126 to be fixed to the base plate 150, which is not limited to the slope surface. Therefore, this can be applied in various shapes, such as being formed to have a curved surface.

As described above, when the end of the protruding part 126 is bent, the bent portion supports the lower surface of the base plate 150 and fastens the base plate 150 to the sleeve holder 120 and may thus be very firmly fastened.

Figure 7:
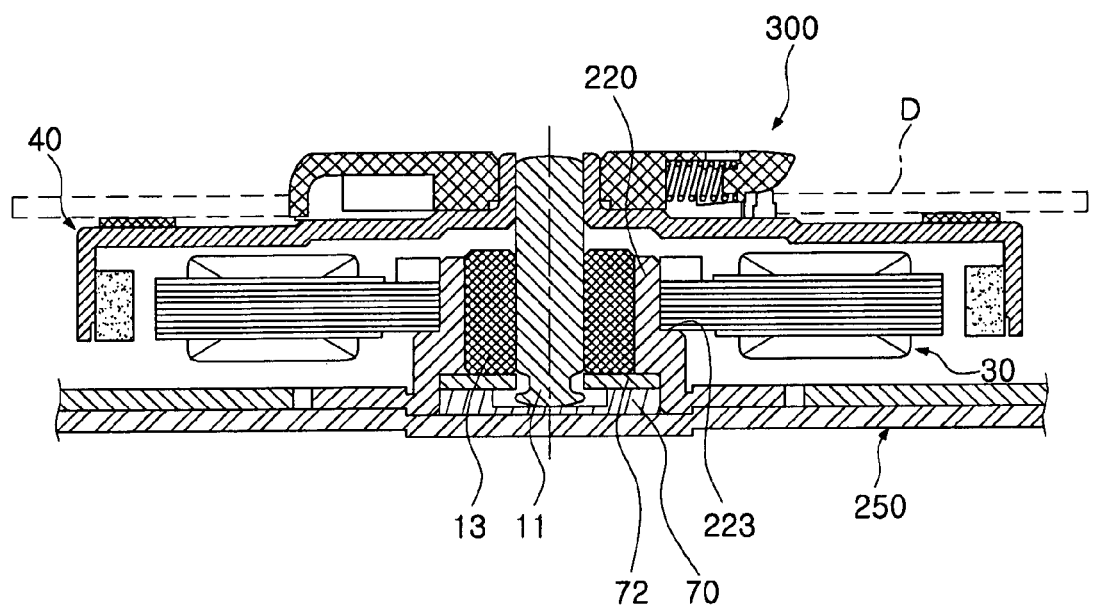
FIG. 7 is a cross-sectional view schematically showing a motor according to another exemplary embodiment of the present invention.

FIG. 7 is a cross-sectional view schematically showing a motor according to another exemplary embodiment of the present invention. Further, FIG. 8 is a perspective view showing a sleeve holder of FIG. 7 and FIG. 9 is a perspective view showing a base plate of FIG. 7.

Figure 8:
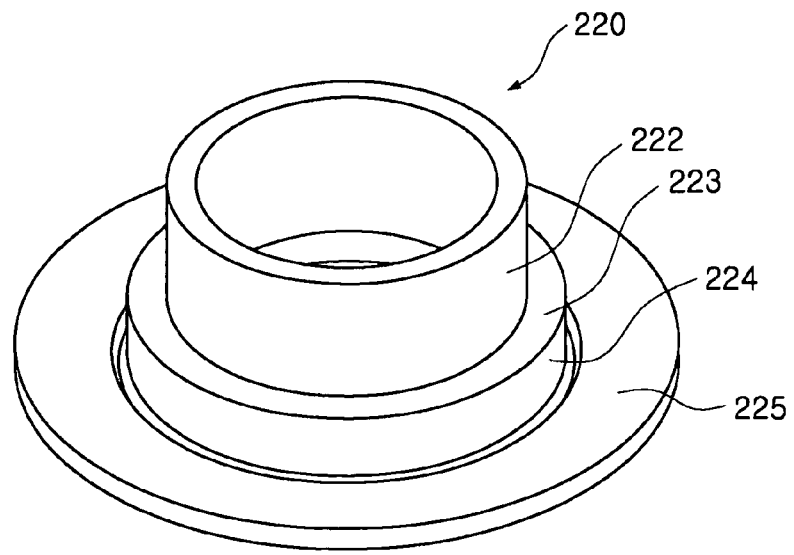
FIG. 8 is a perspective view showing a sleeve holder of FIG. 7.
Figure 9:
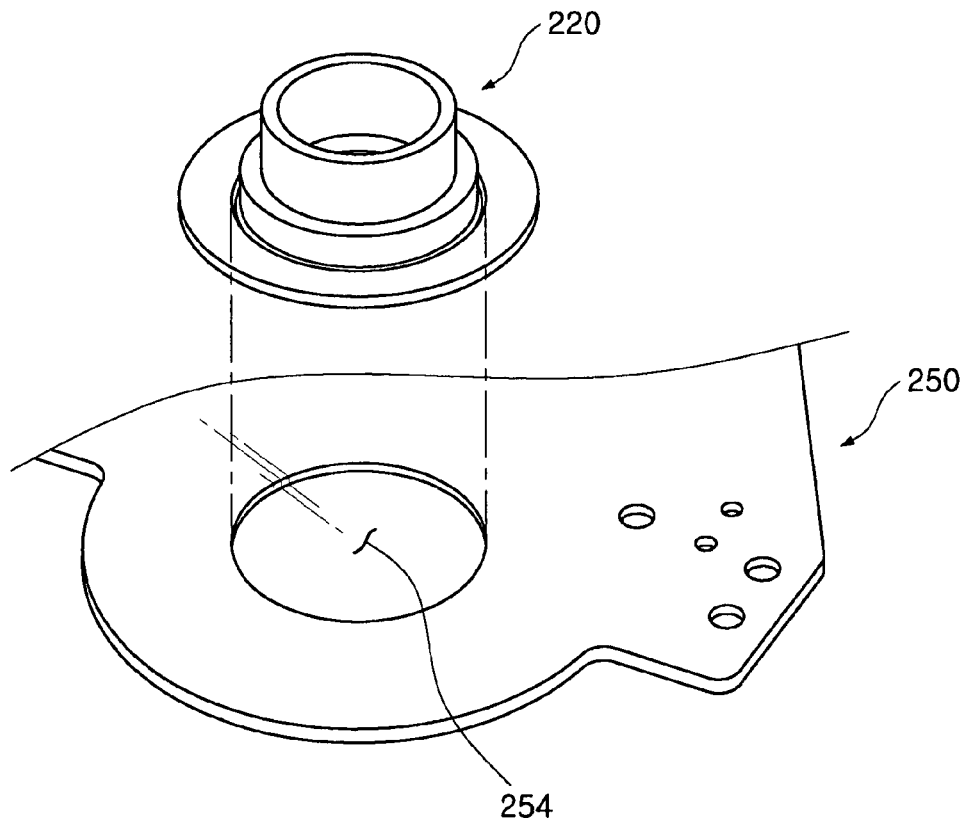
FIG. 9 is a perspective view showing the base plate of FIG. 7.

Referring to FIGS. 7 to 9, a base plate 250 of a motor 300 according to the present exemplary embodiment is configured similar to the base plate 50 of FIG. 1, but has a difference in the size of a receiving part 254.

Described in more detail, in the base plate 250 according to the present exemplary embodiment, the receiving part 254 is formed to have a size corresponding to the outer peripheral edge of the lower surface of an extending part 224 of a sleeve holder 220 to be described below.

In addition, similar to the above-mentioned exemplary embodiments, the sleeve holder 220 according to the present exemplary embodiment is configured to include a body part 222, an extending part 224, and a flange part 225 but has the difference in that the flange part 225 is protruded while forming a step upward in a shaft direction from the lower surface of the extending part 224.

In other words, the flange part 225 according to the present exemplary embodiment is formed to be protruded in an outer-diameter direction at the position moving upward in a shaft direction by a predetermined distance from the lowest end surface of the extending part 224. In this case, the vertical distance between the lower surface of the flange part 225 and the lowest end surface of the extending part 224 is formed to have the same distance as the depth of the receiving part 254 of the base plate 250.

Therefore, when the sleeve holder 220 is seated on the base plate 250, the lowest end surface of the extending part 224 is received in the receiving part 254 and the lower surface of the flange part 225 contacts the lower surface of the base plate 250 along the circumference of the receiving part 254.

The step of the sleeve holder 220 may be formed by press machining based on the sleeve holder 20 of FIG. 1 as described above.

In the motor 300 according to the present exemplary embodiment, the sleeve holder 220 can be combined with the base plate 250, since the lower surface of the extending part is firmly inserted into the receiving part 254.

Further, in the motor 300 according to the present exemplary embodiment, the sleeve holder 220 may fixedly fastened with the base plate 250 by the bonding or welding method, or the like, similar to the foregoing exemplary embodiments. In this case, in the motor 300 according to the present exemplary embodiment, the lower surface of the flange part 225 on which the sleeve holder 220 surface-contacts the base plate 250 and the lower surface of the extending part 224 surface-contacting the bottom surface of the receiving part 254 may be used as the bonding surface.

The motor according to the present invention is not limited to the foregoing exemplary embodiments and can therefore be variously applied.

For example, the foregoing exemplary embodiments form the sleeve holder of which the protruding part (126 of FIG. 4) is a hollow cylindrical shape but is not limited thereto. As a result, the sleeve holder of which the inside of the protruding part is completely filled can be formed.

In addition, the foregoing exemplary embodiments describe, by way of example, a case in which the protruding part 126 is formed in the sleeve holder (120 of FIG. 4). On the other hand, it is possible to fasten the sleeve holder to the base plate by forming the protruding part on the upper surface of the base plate and forming the insertion hole in the flange part of the sleeve holder.

Figure 10:
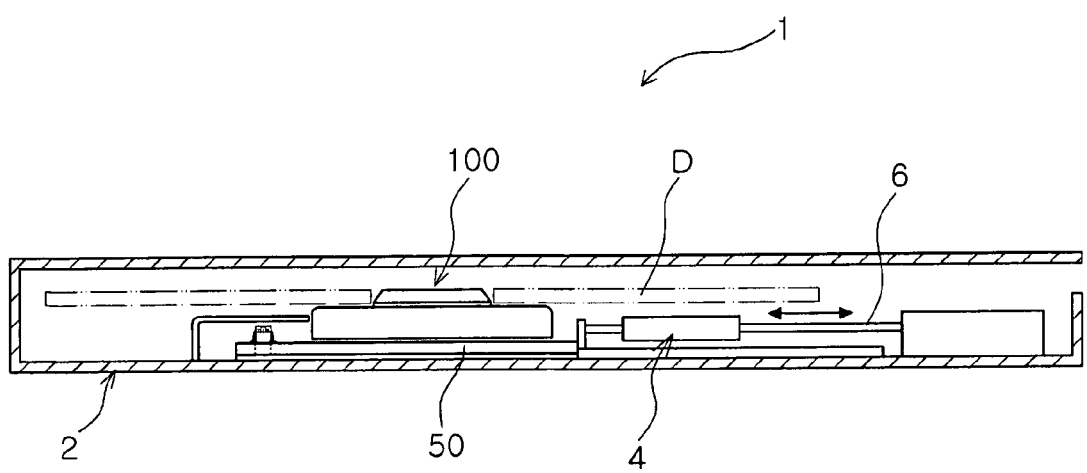
FIG. 10 is a cross-sectional view schematically showing an optical disc drive according to an exemplary embodiment of the present invention.

FIG. 10 is a cross-sectional view schematically showing an optical disc drive according to an exemplary embodiment of the present invention.

Referring to FIG. 10, the optical disc drive 1 according to the exemplary embodiment of the present invention is equipped with the motor 100 according to the foregoing exemplary embodiment of FIG. 1. However, the present exemplary embodiments are not limited thereto and the optical disc drive 1 may be equipped with any one of the motors 100, 200, and 300 according to the foregoing exemplary embodiments.

The optical disc drive 1 according to the exemplary embodiment of the present invention may include a frame 2, an optical pickup mechanism 4, and a moving mechanism 6.

The frame 2 serves as a case of the optical disc drive 1 and the inside thereof is fixed with the base plate 50 of the motor 100.

The optical pickup mechanism 4 is equipped to move in the lower space of the disc D equipped on the motor 100 and receives data from the disc D.

The moving mechanism 6 moves the optical pickup mechanism 4 in a diameter direction of the diameter direction to perform the receiving function of data over the front surface of the disc D.

As set forth above, the motor and the optical disc drive using the same use the base plate integrated with the supporting plate and directly fasten fixedly the sleeve holder onto the base plate without using the sleeve holder and the supporting plate according to the related art. Therefore, the present invention further reduces the components of the motor as compared to the related art, thereby making it possible to reduce the manufacturing costs and simplify the manufacturing process.

Further, the motor according to the present invention uses the sleeve holder formed by performing the pressing working, or the like, on the steel plate without forming the sleeve holder by performing the cutting working on the brass as in the related art. In other words, the present invention can manufacture the small sleeve holder using a cheaper material than the brass through a simpler process, thereby making it possible to reduce the manufacturing cost and manufacturing time of the sleeve holder and minimize the size of the motor.

In addition, in the motor according to the present invention, the protruding supporting part of the base plate is inserted into the inside of the bearing assembly, that is, the inside of the sleeve hole to fixedly fasten the bearing assembly to the base plate. Therefore, the sleeve holder widely surface-contacts the lower surface of the flange part through the inner peripheral surface of the extending part, or the like, and contacts the base plate and is bonded thereto. Therefore, the sleeve holder may be firmly and stably fastened to the base plate.

Further, the related art combines the base plate and the supporting plate, respectively, to the sleeve holder and thus, performs the combining process twice. However, the present invention does not perform the process of combining the supporting plate to the sleeve holder and can thus combine the sleeve holder with the base plate by only one-time process. Therefore, the present invention can minimize the pressure applied to the sleeve and the base plate in the combining process and thus, reduce the influence on the shaft verticality of the motor, thereby making it possible to improve the process yield.

Meanwhile, the motor and the optical disc drive according to the present invention are not limited to the foregoing exemplary embodiments and therefore, may be variously modified by those skilled in the art within the technical scope of the present invention.

Further, the foregoing exemplary embodiments describe, for example, the motor provided in the optical disc drive and are not limited thereto. As a result, any motor including the sleeve holder and the base plate may be variously applied.

While the present invention has been shown and described in connection with the exemplary embodiments, it will be apparent to those skilled in the art that modifications and variations can be made without departing from the spirit and scope of the invention as defined by the appended claims.

What is claimed is:

1. A motor, comprising:
a base plate formed to have a plate shape and having a receiving part in a groove shape; and a sleeve holder including a cylindrical body part in which a sleeve is insertedly fastened, an extending part protruded at the position adjacent to the flange part to extend an outer diameter thereof along the outer peripheral surface of the body part, and a flange part formed to be horizontally protruded in an outer-diameter direction from the lower end portion of the extending part to surface-contact the upper surface of the base plate,
the flange part protruding while forming a step upward in a shaft direction from the lower end surface of the extending part, and
the base plate having a receiving part in a groove shape formed at a position corresponding to the extending part of the sleeve holder and the lower end surface of the extending part is inserted into the receiving part.

2. The motor of claim 1, wherein the flange part includes at least one protruding part protruded downward from a lower surface of the flange part opposite to the base plate,
the base plate includes at least one insertion hole formed at a position corresponding to the protruding part, and
the sleeve holder and the base plate are fixedly fastened to each other by inserting the protruding part into the insertion hole.

3. The motor of claim 2, wherein the protruding part is formed by burring machining or press machining.

4. The motor of claim 3, wherein the end of the protruding part is bent in an outer-diameter direction to support the lower surface of the base plate.

5. The motor of claim 1, wherein the sleeve holder and the base plate are fastened to each other by at least one fastening method of press-fitting, bonding, and welding.

6. The motor of claim 1, wherein the sleeve holder and the base plate are manufactured by press machining or injection molding.

* * * * *